United States Patent [19]

Ohta et al.

[11] Patent Number: 4,724,921

[45] Date of Patent: Feb. 16, 1988

[54] MAIN STAND MOUNTING MECHANISM

[75] Inventors: Kozo Ohta; Nagatoshi Katagiri; Mitsuru Iseno, all of Saitama, Japan

[73] Assignee: Honda Giken Kogyo Kabushiki, Tokyo, Japan

[21] Appl. No.: 898,930

[22] Filed: Aug. 21, 1986

[30] Foreign Application Priority Data

Aug. 21, 1985 [JP] Japan .................................. 60-183599

[51] Int. Cl.⁴ ............................................. B62K 11/04
[52] U.S. Cl. .................................... 180/228; 180/219; 280/293; 280/295
[58] Field of Search ............... 180/219, 205, 227, 228; 280/284, 293, 295, 296, 301

[56] References Cited

U.S. PATENT DOCUMENTS

| 4,019,594 | 4/1977 | Koyama | 280/284 |
| 4,324,306 | 4/1982 | Ishihara et al. | 180/228 |
| 4,373,602 | 2/1983 | Timita et al. | 180/228 |
| 4,597,958 | 2/1986 | Ishihara | 180/219 |

Primary Examiner—John J. Love
Assistant Examiner—Donn McGiehan
Attorney, Agent, or Firm—Lyon & Lyon

[57] ABSTRACT

Mechanisms for mounting a main stand on a motorcycle are disclosed. The linkage between the front portion of the motorcycle power unit and the motorcycle body frame is used to mount the main stand. One mechanism employs a link connected to a bracket on the body frame and to bosses extending from the power unit. Another mechanism uses two links connected to each other and a bracket and bosses. A main stand is mounted to the rear end portion of the linkage mechanism.

11 Claims, 4 Drawing Figures

4,724,921

MAIN STAND MOUNTING MECHANISM

BACKGROUND OF THE INVENTION

The field of the present invention is mechanisms for mounting stands on motorcycles and the like.

In motorcycles which have a power unit connected to a rear wheel and suspended so as to be capable of pivoting at the rear of the motorcycle body frame, there generally have been two types of arrangements used to mount a main stand for the vehicle. One conventional type of arrangement is to mount a bracket integrally with the rear of the motorcycle body frame. The problem with such an arrangement is that it is necessary to arrange the bracket to extend to the rear of the motorcycle and yet remain attached to the motorcycle body frame. Such an arrangement is generally implemented using a large bracket which disadvantageously increases the weight and cost of the vehicle. The foregoing problem is more serious in a vehicle having its center of gravity to the rear because the bracket must then extend even farther to provide adequate support.

Another type of mechanism used to mount a main stand is a boss which is integrally attached to the power unit casing. One problem with such an arrangement is that when the power unit is driven while the main stand is extended, the vehicle may be vibrated or moved slightly by the oscillations transmitted to the main stand from the power unit casing. Also, such arrangements do not allow the main stand to support the motorcycle when the power unit is removed.

SUMMARY OF THE INVENTION

The present invention is directed to a main stand mounting mechanism of low weight and cost. The mounting mechanism includes a hanger link which is pivotally connected to the motorcycle body frame. The hanger link extends rearwardly and the power unit is suspended above it by means of an elastic damper. A main stand can be mounted to the hanger link adjacent its distal end.

DETAILED DESCRIPTION OF THE PREFERRED EMBODIMENTS

Figure 1:
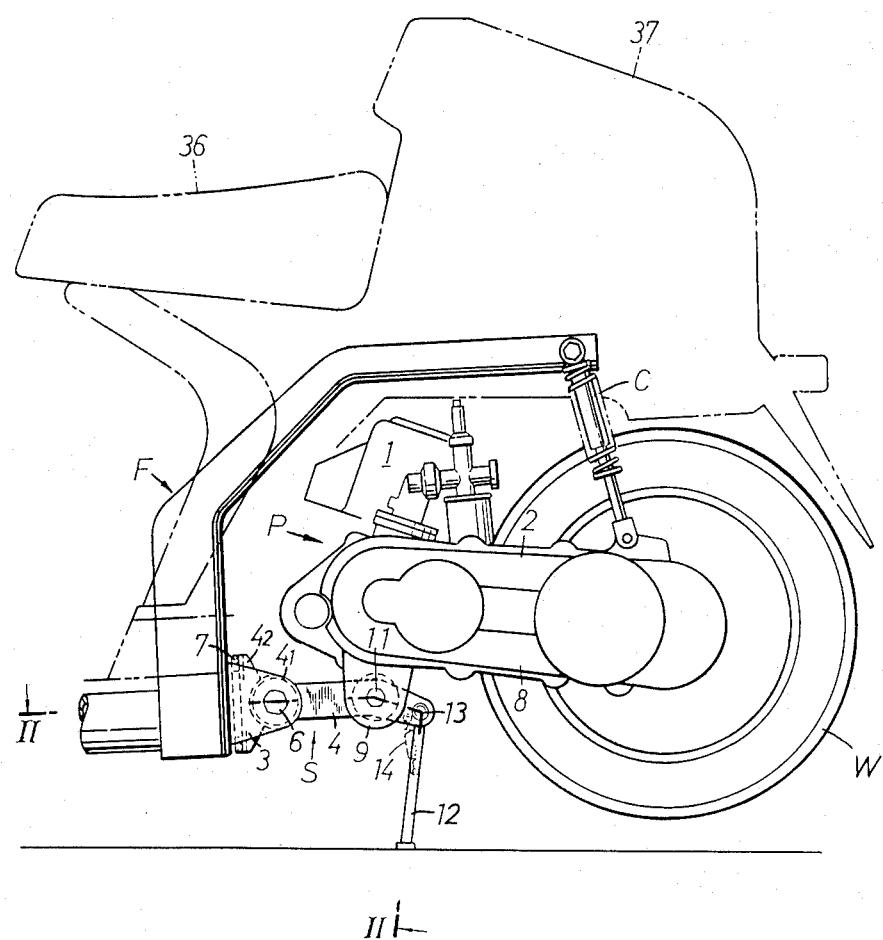
FIG. 1 is a side view of the rear of a motorcycle employing one embodiment of the present invention.
Figure 2:
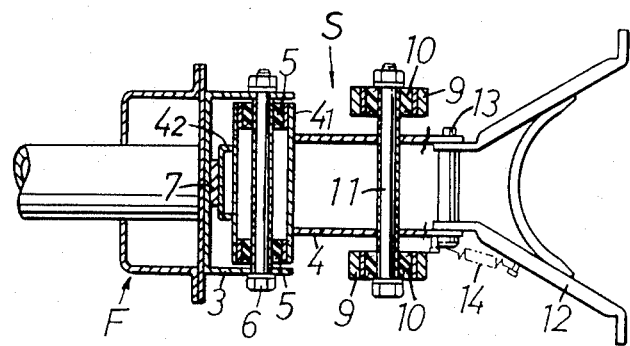
FIG. 2 is a sectional top view taken along line II—II of FIG. 1.

FIGS. 1 and 2 illustrate one embodiment of the present invention. A power unit P, which is connected to a rear wheel W, is located to the rear of a motorcycle body frame F of a motorcycle. The front of the power unit P is connected to the motorcycle body frame F by a suspension mechanism S. The power unit P includes an engine 1 connected to a transmission 2, revolutions of the engine 1 being transmitted to the rear wheel W by the transmission 2.

Following is a description of the suspension mechanism S. From the lower part of the motorcycle body frame F a bracket 3 projects rearwardly and is integrally connected to the body frame F. The bracket 3 has a U-shape which opens rearwardly. Into the open end of the bracket 3 is inserted a front cylindrical end $4_1$ of a hanger link 4. The front end $4_1$ is connected to the bracket 3 by a supporting bolt 6 with an elastic damper in the form of a bushing 5 between the supporting bolt 6 and the front end $4_1$. The front end $4_1$ is capable of pivoting on the supporting bolt 6. Projected integrally with the front end $4_1$ of the hanger link 4 is a snubber member including a square piece $4_2$ which extends radially and vertically in both directions from the front end $4_1$. Between the square piece $4_2$ of the snubber member and the rear end surface of the bracket 3 is placed an elastic damper plate 7 which can be fixed to either the square piece $4_2$ or the rear end surface of the bracket 3.

The hanger link 4 extends rearwardly from the motorcycle frame F and is bent at a downward angle at its rear. The bent portion of the hanger link 4 is connected to the power unit P by a pair of bosses 9. The bosses 9 extend downwardly from the power unit P, out of the front lower portion of the power unit casing 8 and to the hanger link 4. The bosses 9 are connected to the bent portion of the hanger link 4 by a hanger bolt 11 with an elastic damper in the form of bushings 10 between the hanger bolt 11 and the bosses 9. Therefore, the front of the power unit P is connected to the motorcycle body frame F by the hanger link 4 and the driving oscillations of the power unit are dampened and absorbed by the elastic bushings 10 thereby reducing their transmission to the hanger link 4. To the rear end of the hanger link 4, which extends rearwardly from the bosses 9, is attached the upper end of the main stand 12 by a stand spindle 13. The main stand 12 is capable of pivoting on the spindle 13 so that the main stand 12 can be placed in an up (see FIG. 2) or down (see FIG. 1) position. To the middle portion of the main stand 12 and the rear end of the hanger link 4 is attached a toggle spring 14. The tension of the toggle spring 14 keeps the main stand 12 in either the extended (down) or folded (up) position.

Following is a description of the functioning of one embodiment of the present invention as shown in FIGS. 1 and 2. FIG. 1 illustrates the rear of a motorcycle wherein the main stand 12 is engaged. The main stand 12 is capable of supporting the weight of the rear end of the motorcycle due to the support of the hanger link 4 which extends from the motorcycle body frame F to a location beneath the power unit P. The main stand 12 places the motorcycle in a stable and secure standing state even if the motorcycle has its center of gravity located rearwardly of the vehicle center.

When the power unit P is driven with the main stand 12 in its extended position, as shown in FIG. 1, the power unit P oscillates horizontally and vertically about the hanger bolt 11. However, these oscillations are dampened and absorbed by the elastic bushings 10 thereby substantially reducing their transmission to the hanger link 4 and the main stand 12. Therefore, the motorcycle does not tend to be fractionally displaced by such oscillations. Also, the substantially reduced oscillations that do reach the hanger link 4 are further dampened and absorbed by the elastic bushings 5 and the elastic damper plate 7 on the snubber member. Therefore, these oscillations tend not to be transmitted to the motorcycle body frame F. Finally, when the power unit P is removed from the motorcycle body frame F for maintenance, the mainstand 12 can still be activated to put the motorcycle in a standing state because of the way the hanger link 4 is attached to the body frame F.

Figure 4:
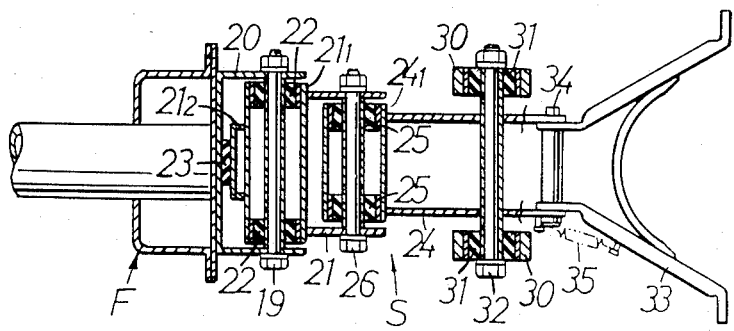
FIG. 4 is a sectional top view taken along line IV—IV of FIG. 3.
Figure 3:
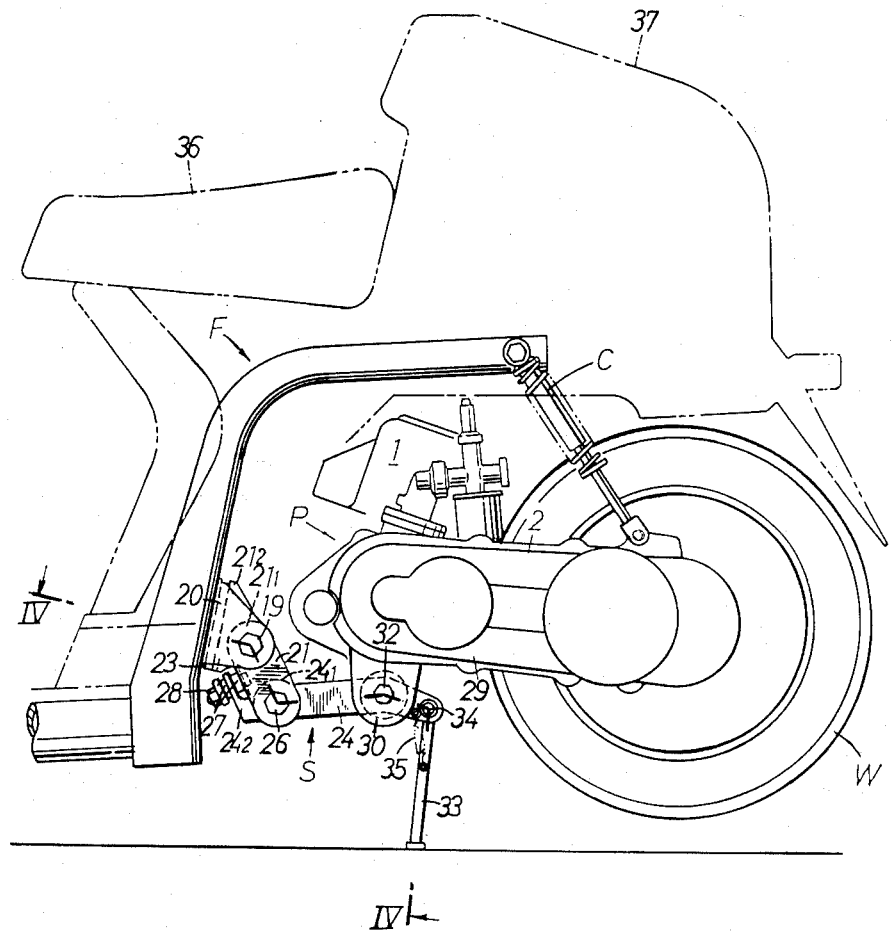
FIG. 3 is a side view of the rear of a motorcycle employing a second embodiment of the present invention.

FIGS. 3 and 4 illustrate a second embodiment of the present invention with a suspension mechanism S at the front of the power unit P which differs from that of the first embodiment. A U-shaped bracket 20 is integrally connected to the rear end of the motorcycle body frame F. Into the open rear of the bracket 20 is inserted a cylindrical end $211_1$ of the middle link 21. The cylindrical end $21_1$ is pivotally connected to the bracket 20 by a supporting bolt 19 with an elastic bushing 22 between the supporting bolt 19 and the cylindrical end $21_1$. A snubber member including square piece $21_2$ integral with the front end 21, of the middle link 21 is projected radially therefrom. The square piece $21_2$ extends vertically in both directions. An elastic damper plate 23 is located between the square piece $21_2$ and the rear end surface of the bracket 20 and can be fixed to either the square piece $21_2$ or the rear end surface of the bracket 20.

The middle link 21 extends rearwardly and downwardly. The lower end of the middle link 21 is pivotally connected to a front cylindrical end $24_1$ of a hanger link 24 by a middle supporting bolt 26 with an elastic bushing 25 between the supporting bolt 26 and the front end $24_1$. Integrally attached to the front end $24_1$ of the hanger link 24 is a journal piece $24_2$ which extends outwardly and upwardly from the front end $24_1$. The journal piece $24_2$ is connected to the front middle portion of a connecting bolt 28 through the intermediary of elastic damper plates 27.

The hanger link 24 extends rearwardly and is bent so that it extends downwardly and rearwardly at its rear portion. The power unit P is connected to the hanger link 24 at its bent portion. A pair of bosses 30 extend downwardly from the power unit P to below the front part of the power unit casing 29. The bosses 30 are connected to the bent portion of the hanger link 24 by a hanger bolt 32 with elastic bushings 31 located between the hanger bolt 32 and the bosses 30. Accordingly, the front end of the power unit P is connected to the motorcycle body frame F by the hanger link 24 and the middle link 21.

At the rear end of the hanger link 24, the upper end of the main stand 33 is pivotally connected to the hanger link 24 by the stand spindle 34. A toggle spring 35 is attached to the middle portion of the main stand 33 and the rear end of the hanger link 24 so as to provide tension in order to keep the main stand 33 in the extended or folded position.

The second embodiment, as shown in FIGS. 3 and 4, performs an overall function provided by the first embodiment of FIGS. 1 and 2. When a motorcycle is in the standing position because the main stand 33 is extended, the main stand 33 is capable of supporting the motorcycle from the rear end of the motorcycle body frame F to the main stand 33 due to the support provided by the hanger link 24 and the middle link 21. When the main stand 33 is in the extended position and the power unit P is being driven, the oscillations of the power unit in the vertical and horizontal directions about the hanger bolt 32, are dampened and absorbed by the elastic bushing 31 and thus the oscillations of the main stand 33 are substantially reduced. Therefore, the motorcycle tends not to be fractionally displaced by such oscillations when it is in a standing position. Also, since the oscillations of the power unit are dampened and absorbed by the elastic bushings 31, 25 and 22 and by the elastic damper plates 27 and 23, they are not easily transmitted to the motorcycle body frame F. Furthermore, when the power unit P is removed from the motorcycle body frame F for maintenance, the main stand 33 can still support the motorcycle in a standing state.

FIGS. 1 and 3 further illustrate a seat 36 and a trunk 37.

The foregoing embodiments illustrate how the main stand can be mounted on a motorcycle body frame by means of a hanger link which supports the power unit without providing a bracket for supporting the main stand thereby reducing the cost and weight of the motorcycle. The suspension mechanisms of the preferred embodiments also allow the main stand to be mounted further to the rear of the motorcycle thereby providing support even if the motorcycle has a center of gravity located rearwardly.

While embodiments and applications of this invention have been described, it will be apparent to those skilled in the art that many more modifications are possible without departing from the inventive concepts herein. The invention, therefore, is to be accorded the full scope of the appended claims.

What is claimed is:

1. A motorcycle vehicle, comprising:
   a body frame;
   a power unit including an engine, a rear wheel and a transmission connecting said engine to said wheel;
   a main stand; and
   a pivot connection between said power unit and said body frame, including:
     a pivot mount on said body frame;
     an elongated hanger link;
     means for pivotally connecting said hanger link at one end to said pivot mount;
     means at the other end of said hanger link for pivotally mounting said main stand;
   means on said hanger link for pivotally connecting said power unit; and
   snubber means operated by said hanger link for securing said hanger link with respect to said body frame upon predetermined angular movement of said hanger link one end connecting means with respect to said body frame.

2. A motorized vehicle according to claim 1 in which said means connecting said hanger link one end to said body frame includes a rotatable body pivotally cohntected to said mounting bracket; and said snubber means including a member extending radially from said rotatable body to engage said body frame upon a predetermined rotation of said hanger link.

3. A motorized vehicle according to claim 2 in which said snubber means includes an elastic damper plate between said radially extending member and said body frame.

4. A motorized vehicle according to claim 3 in which said elastic damper plate is fixed to said radially extending member.

5. A motor vehicle according to claim 2 in which said means connecting said hanger link one end to said body frame includes a middle link bearing said rotatable body at one end and having its other end pivotally connected to said hanger link one end.

6. A motor vehicle according to claim 1 in which each of said pivot connecting means include a pivot pin; journal means engaging said pin for pivotal movement; and elastic bushing means between said pin and said journal means.

7. A motorized vehicle, comprising:
- a body frame;
- a power unit including an engine, a rear wheel, and a transmission connecting said engine to said rear wheel;
- a meain stand; and
- a pivot connection between said power unit and said body frame, including:
  - a pivot mount on said body frame;
  - an elongated hanger link extending substantially parallel and subjacent to said power unit;
  - means for pivotally connecting said hanger link at one end to said pivot mount;
  - means at the other end of said hanger link for pivotally mounting said main stand;
  - means intermediate the ends of said hanger link for pivotally connecting said power unit; and
  - snubber means operated by said hanger link for securing said hanger link with respect to said body frame upon predetermined angular movement of said hanger link one end connecting means with respect to said body frame.

8. A motorized vehicle according to claim 7 in which said means connecting said hanger link one end to said body frame includes a rotatable body pivotally connected to said mounting bracket; and said snubber means including a member extending radially from said rotatable body to engage said body frame upon a predetermined rotation of said hanger link.

9. A motorized vehicle according to claim 8 in which said snubber means includes an elastic damper plate between said radially extending member and said body frame.

10. A motorized vehicle according to claim 9 in which said elastic damper plate is fixed to said radially extending member.

11. A motorized vehicle according to claim 8 in which said means connecting said hanger link one end to said body frame includes a middle link bearing said rotatable body at one end and having its other end pivotally connected to said hanger link one end.

* * * * *

UNITED STATES PATENT AND TRADEMARK OFFICE
CERTIFICATE OF CORRECTION

PATENT NO. : 4,724,921
DATED : February 16, 1988
INVENTOR(S) : Kozo Ohta et al.

It is certified that error appears in the above—identified patent and that said Letters Patent is hereby corrected as shown below:

On lines 47 and 48, column 4, replace "cohntected" with -- connected --.

On line 6, column 5, replace "meain" with -- main --.

Signed and Sealed this

Twenty-ninth Day of November, 1988

Attest:

DONALD J. QUIGG

*Attesting Officer*          *Commissioner of Patents and Trademarks*